May 21, 1935.  G. H. LECARPENTIER  2,002,184
ANTIFREEZE INDICATOR
Filed Jan. 2, 1931  3 Sheets-Sheet 1

Inventor
George H. Lecarpentier
By Williams, Bradbury, McCabe & Hinkle
Attys.

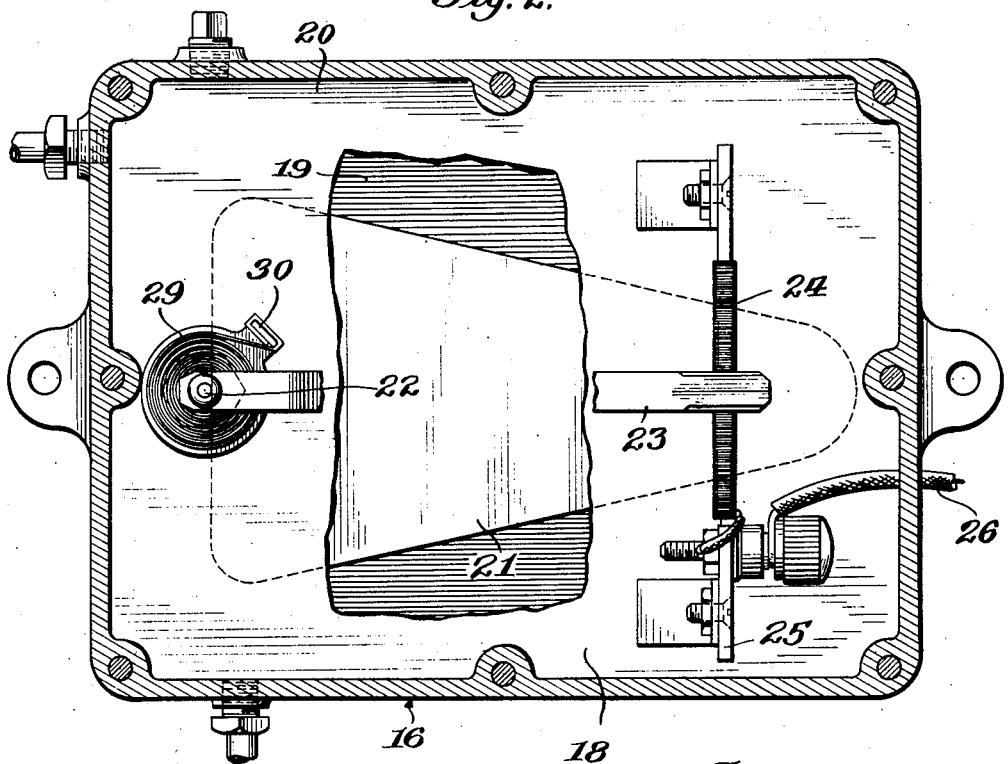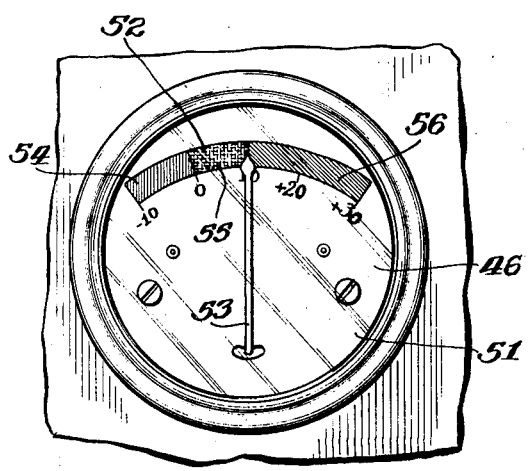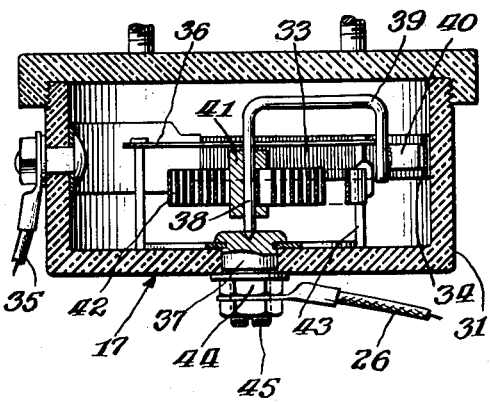

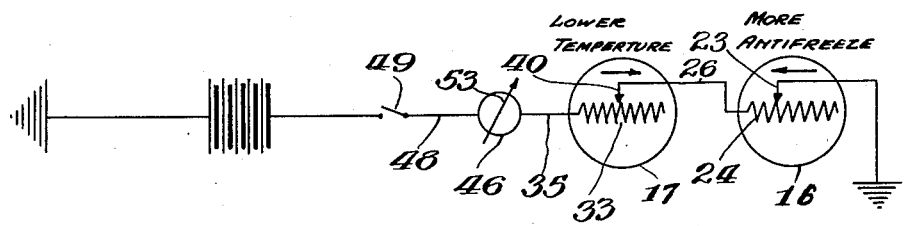
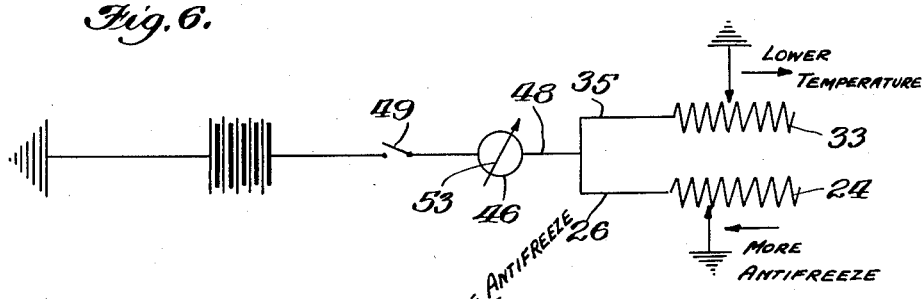
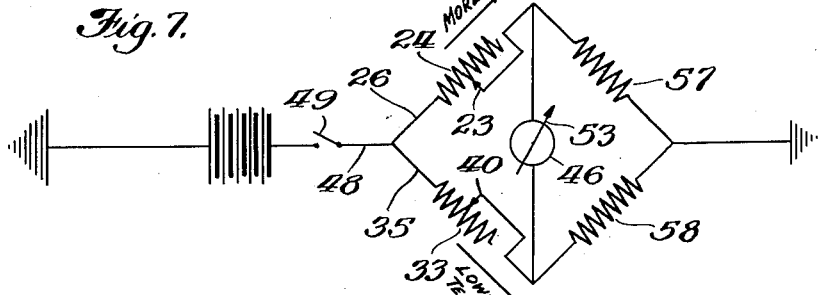
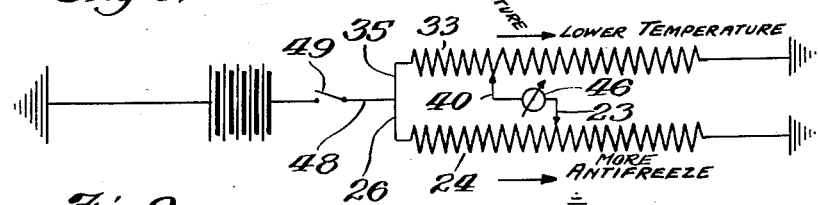
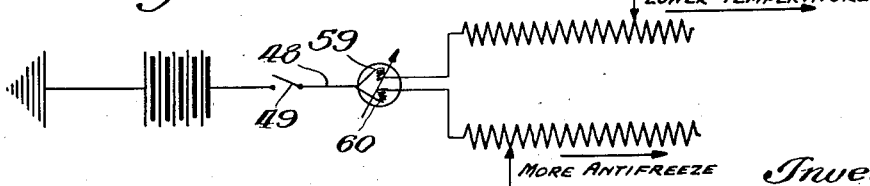

Patented May 21, 1935

2,002,184

UNITED STATES PATENT OFFICE 2,002,184

ANTIFREEZE INDICATOR

George H. Lecarpentier, Chicago, Ill., assignor, by direct and mesne assignments, to Albert G. McCaleb, Evanston, Ill.

Application January 2, 1931, Serial No. 506,190

8 Claims. (Cl. 177—311)

This invention relates to anti-freeze indicators particularly suited for indicating the danger of freezing of the liquid cooling medium of an internal combustion engine.

One of the objects of the invention is to provide an improved anti-freeze indicator of the general type described and claimed in my copending application Serial No. 502,345, filed December 15, 1930 (Case 2).

A further object of the invention is to provide an anti-freeze indicator in which the specific gravity of the cooling solution and the outside temperature conjointly actuate a single indicating instrument to show the liability of the solution to freeze under prevailing atmospheric temperature.

A further object is to provide an anti-freeze indicator comprising an electrical indicating instrument controlled by the specific gravity of the cooling solution and by the prevailing outside temperature to indicate the margin of safety against freezing.

Other objects, advantages and capabilities of the invention will hereinafter appear from the following description of preferred embodiments thereof, taken in conjunction with the accompanying drawings, in which, Figure 1 is a diagrammatic view of one embodiment of the invention mounted in operative relation upon an automobile.

Fig. 2 is a sectional view of a hydrometer partly broken away to disclose interior parts.

Fig. 3 is a diagrammatic sectional view of a suitable form of thermometer.

Fig. 4 is a front view of a suitable electrical indicating instrument.

Fig. 5 is a wiring diagram of one embodiment of the invention.

Fig. 6 is a wiring diagram of another embodiment of the invention.

Fig. 7 is a wiring diagram of still another embodiment of the invention.

Fig. 8 is a wiring diagram of still another embodiment of the invention.

Fig. 9 is a wiring diagram of still another form of the invention.

Figure 1:
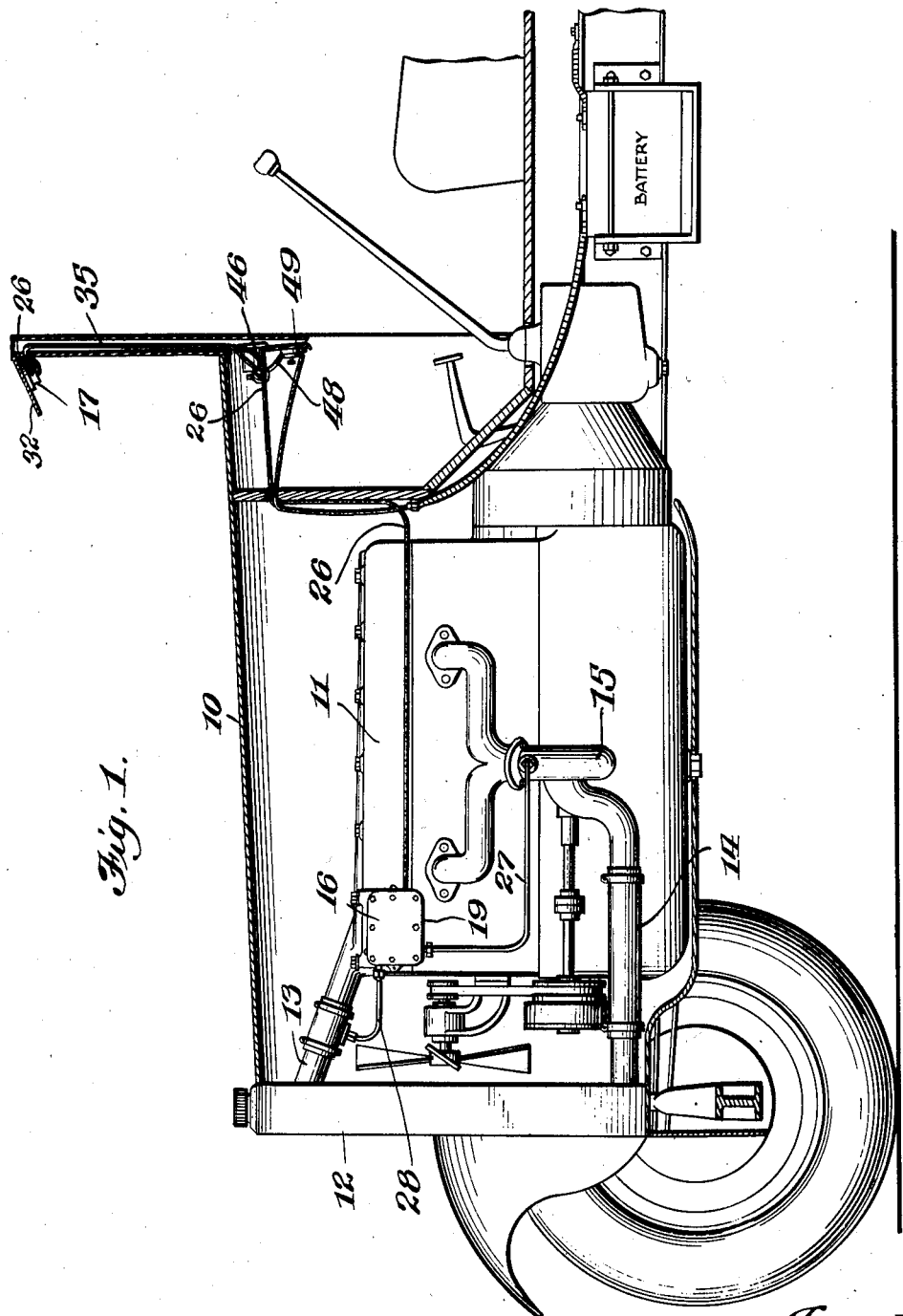

Referring to the drawings, the numeral 10 designates an automobile, the numeral 11 the engine thereof, which comprises a water jacket connected to a radiator 12 by means of an upper hose 13 and lower hose 14. A pump 15 circulates the cooling solution in the usual manner around the cooling system.

The automobile 10 is equipped with a hydrometer 16 and thermometer 17 which may suitably be of the general character of the corresponding elements described and illustrated in my co-pending application referred to above.

The hydrometer 16 comprises a housing 18 having two chambers 19 and 20 alongside each other. The chamber 19 contains a float 21 which is pivotally mounted by means of a pin 22 which extends through the wall between the chambers 19 and 20 through a suitable gland. Within the chamber 20 the pin 22 carries a resilient metal arm 23 which cooperates with a variable resistance 24 suitably mounted upon a bar 25. For use in the system shown in Fig. 5, the arm 23 is grounded through the housing 18 and the lower end of the resistance 24 is connected to a conductor 26.

The housing 18 is mounted in any suitable position, for example it may be bolted to the engine as shown in Fig. 1. A small pipe 27 leads from the high pressure side of the pump 15 to a suitable position on the chamber 19, for example the bottom, and an outlet pipe 28 leads from the chamber 19 back to the cooling system, for example, into the upper hose 13. The pipes 27 and 28 are so connected to the chamber 19 that the same is maintained full or substantially full of cooling solution, in which the float 21 is completely immersed.

The float 21 is pressed downwardly by a coiled spring 29, one end of which is secured to the pin 22 the other end of which is secured to a post 30 which is adjustable as to position within the chamber 19. The spring 29 may be arranged to apply an upward force to the float 21, the weight of which is correspondingly increased. In either case the buoyancy of the submerged float in liquid within the range of specific gravity contemplated, the weight of the float, and the force applied by the spring are balanced at a position of the float depending upon the specific gravity of the liquid, said position being higher the higher the specific gravity.

The hydrometer shown in Fig. 2 is suitable for use with aqueous solutions of anti-freeze which are lighter than water, for example ethyl alcohol. When the chamber 19 is full of water the arm 23 occupies a position near the upper end of the resistance winding 24. When the chamber 19 is full of aqueous solution of alcohol having the lowest freezing point contemplated, for example −40° F., the arm 23 has a position adjacent the lower end of the resistance winding 24, the characteristics of the spring 29 being chosen and adjusted to permit the desired range of movement.

It will readily be understood that with antifreeze substances such as glycol and glycerine, which give solutions having greater specific gravity than water the hydrometer construction must be modified. For example, the conductor 26 should be connected to the upper end of the resistance winding 24 to operate under the diagram shown in Fig. 5, and the spring and float must be replaced to accommodate the different relation between change of specific gravity and freezing point.

The thermometer 17 preferably comprises a circular case 31 provided with a suitable cover and mounted in a suitable position outside the car, for example beneath the windshield visor 32 as shown in Fig. 1. The case 31 may suitably be made of insulating material, and a resistance winding 33 wound on a strip of insulation 34 is located around the inner side of its circular wall. One end of the resistance winding 33 is connected to a binding post to which is connected the conductor 35. A frame 36 is mounted upon the base of the case 31 and is connected to an exterior binding post 37 to which the conductor 26 is connected. The frame 36 provides bearings for an arbor 38 which carries a radial extension 39 upon which is mounted a resilient arm 40, adapted to contact with the winding 33. The arbor 38 carries a barrel 41 to which is secured one end of a coiled strip of bimetal 42 which is responsive to change of temperature. The other end of the strip is secured to a post 43 carried by the frame 36. In order to adjust the contact arm 40 in relation to the winding 33, I prefer to mount the frame 36 adjustably upon the case 31 with the aid of a nut 44 which is threaded on the stem 45 carried by the frame 36.

The hydrometer 16 and thermometer 17 are coordinated so that the rate of change in the resistance 24 per degree change of freezing point of the solution is substantially same as the rate of change in the resistance 33 per degree change of atmospheric temperature. With a fairly long coil 42 of bimetal the displacement of the arm 40 is substantially proportional to the change of temperature and the winding 33 may be uniformly disposed upon the strip 34. The winding 24 is preferably constructed with reference to the particular anti-freeze substance with which it is to be used so that the relation between change of freezing point and change of resistance is uniform over the contemplated freezing point range. This may be done by varying the width of the bar 25, modifying the configuration and location of the bar 25, varying the spacing of the winding 24 upon the bar 25 or other suitable expedient.

The conductor 35 is connected to one terminal of an ammeter 46 suitably mounted upon the instrument board 47. The other terminal of the ammeter is connected by conductor 48, including a switch 49, to the battery 50.

The ammeter 46 may suitably be of the moving armature type disclosed in my co-pending application above referred to, having a minimum reading to the left as viewed in Fig. 4. It may be provided with a dial 51 having a colored scale 52, with which a pointer 53 cooperates. The scale 52 may comprise three panels 54, 55 and 56 arranged from left to right. The panel 54 may be red indicating present danger of the cooling solution freezing at the temperature of the atmosphere. The panel 55 may be yellow to indicate the need of caution, while the panel 56 may be green indicating a condition of safety. If desired, the scale 52 may be calibrated in degrees of temperature to show the margin of safety numerically. The coincidence with the pointer 53 with the junction of the panels 54 and 55 indicates that the freezing point of the solution is the same as the present atmospheric temperature.

The operation of the embodiment of the invention will readily be understood from a consideration of Fig. 5. It will readily be seen, the switch 49 being closed, that a decreasing atmospheric temperature increases the resistance of the ammeter circuit causing a movement of the pointer 53 to the left. When the pointer enters the caution zone 55, anti-freeze material should be added to the cooling medium which has the effect of decreasing the resistance in the ammeter circuit and bringing the pointer 53 over the green panel 56 which indicates safety.

As shown in Fig. 6, the resistance windings 24 and 33 may be arranged in parallel, the conductors 26 and 35 being connected to one terminal of the ammeter 46 and the contact arm 40 being grounded. In this modification the thermometer case 31 may suitably be of metal and the lead 35 and winding 33 insulated therefrom in any suitable manner.

It will readily be understood from Fig. 6 that decreasing atmospheric temperature reduces the current flowing through the ammeter and that the current may be increased by the addition of anti-freeze material, such addition reducing the amount of the resistance 24 in the circuit.

The modification of the invention diagrammatically illustrated in Fig. 7 requires the connection of one of the windings 24 or 33 to be reversed with respect to that shown in the previous modifications. For example the conductor 26 may be connected to the upper end of the winding 24 as seen in Fig. 2 so that addition of anti-freeze will put a greater amount of the resistance 24 in circuit. In this modification the conductors 26 and 35 are connected by the conductor 48 to the battery. The arm 23 of the hydrometer 16 is insulated in any suitable manner and is connected to one terminal of the indicator 46 and to one end of a coil 57, the other end of which is grounded. The contact arm 40, of the thermometer 17, is also insulated in any suitable manner and is connected to the other terminal of the ammeter 46. As will readily be seen from Fig. 7 the circuits described constitute a Wheatstone bridge. The coils 57 and 58 are preferably equal in resistance to half the resistances 24 and 33 respectively so as to give high sensitivity in the critical region of measurement. The indicator 46 functions as a voltmeter and is preferably a high resistance instrument having a zero indication at the junction between the panels 54 and 55. When the contact 40 has a higher potential than the contact 23 due to a relatively high atmospheric temperature or a large anti-freeze content the flow of current through the indicator causes a deflection of the pointer 53 to the right into the safety panel 56. On the other hand when the potential of the contact 23 is greater than that of the contact 40, due to low temperature or low anti-freeze content, so that the cooling solution is in danger of freezing, the current through the indicator is in the opposite direction and the pointer 53 is deflected to the left into the danger panel 54 of the scale 52. One advantage of this modification is that the windings 24 and 33 need not be calibrated to the same resistance change per degree of temperature. Equally satisfactory results can be obtained by making the coils 57 and 58 in the same relative proportion to the coils 24 and 33 respectively.

The modification diagrammatically illustrated in Fig. 8 is along similar lines, but in this case the windings 24 and 33 are relatively long and are divided by the contacts to provide the four resistances of the Wheatstone bridge. The ends of the windings 24 and 33 remote from the conductors 26 and 35 respectively are grounded in any suitable manner.

The modification diagrammatically illustrated in Fig. 9 is similar to that shown in Fig. 6 except that a special ammeter is employed comprising two oppositely directed windings 59 and 60, and the connection of the conductor 26 to the winding 24 is reversed. From this figure it will readily be seen that a decrease of temperature and a corresponding addition of anti-freeze result in a similar increase of current through the coils 59 and 60 so that the indication remains unchanged. A further decrease of temperature causes a larger current to flow through the coil 59 which is so arranged that it tends to move the indication into the danger panel 54.

It will be understood that in all modifications of the invention, a single indication is given which informs the operator of the vehicle whether or not his cooling solution is liable to freeze at the prevailing atmospheric temperature. This indication also shows the margin of parking safety at any moment.

Although the invention has been disclosed in connection with the specific details of preferred embodiments thereof, it must be understood that such details are not intended to be limitative of the invention, except insofar as set forth in the accompanying claims.

What I claim as new and desire to secure by Letters Patent is:

1. A freezing hazard indicator comprising, in combination, a hydrostat exposed to, and moving in response to variations in the specific gravity of, liquid in a circulating system, a thermostat exposed to, and moving in response to variations in, prevailing atmospheric temperature, a pair of independent circuit controlling resistances, operating means connecting the hydrostat with one of said resistances for varying the resistance in response to changes in specific gravity of the liquid, operating means connecting the thermostat with the other resistance for varying the resistance in response to changes in atmospheric temperature, an electrical indicating instrument, a source of current, and means including conductors connecting the source, instrument, and circuit controlling resistances in circuit, the conductors connecting the resistances to the instrument in opposed circuit relationship as regards the control of the instrument by the hydrostatically controlled resistance and the thermostatically controlled resistance in response to increase of specific gravity and increase in temperature, respectively.

2. The combination with a body of liquid constituting the cooling medium for an internal combustion engine, of an electric meter having a movable element, of the class comprising indicator and actuators, moved by the meter, a circuit therefor including a first circuit controlling resistance and a second circuit controlling resistance, a hydrostat subject to, and moving in response to the specific gravity of, the body of liquid, varying the first resistance, a thermostat subjected and actuated in response to the prevailing temperature of the outside atmosphere, varying the second resistance, the circuit including conductors connecting the resistances to the meter in opposed circuit relationship as regards control of the meter by the hydrostatically controlled resistance and the thermostatically controlled resistance in response to an increase in specific gravity and an increase in temperature, respectively, whereby the meter, conjointly affected by the thermostat and hydrostat, is predicative of a danger that the liquid would freeze if subjected to the prevailing atmospheric temperature.

3. A freezing hazard detector comprising variable resistance means, a hydrostat in, and subject to the specific gravity of, a liquid, means operated by the hydrostat for varying the resistance means, a thermostat in, and responsive to the prevailing temperature of, outside atmosphere, means operated by the thermostat for also varying the resistance means, an electric meter and means including conductors for connecting the hydrostatically operated resistance varying means and the thermostatically operated resistance varying means in opposed relation to each other with respect to the meter, oppositely to affect the meter.

4. A freezing hazard detector for the liquid medium in the cooling system of an internal combustion engine, comprising a single movably mounted detector element of the class comprising indicators and actuators, means including a hydrostat immersed in the liquid and subject to the specific gravity thereof and urging the element in one direction in response to rise in the specific gravity of the liquid, and means including a thermostat exposed to outside atmosphere and subject to the prevailing temperature thereof and urging the element in the opposite direction in response to rise in atmospheric temperature,—whereby the hydrostat and thermostat conjointly control the detector element to detect danger of the liquid freezing if subjected to atmospheric temperature.

5. A freezing hazard indicator for an internal combustion engine, said indicator comprising a hydrostat immersed in the cooling liquid of the engine circulating system, a thermostat exposed to prevailing atmospheric temperature, a pair of resistances, a battery, a current indicating instrument, movable contacts for the resistances, means for connecting the contacts with the hydrostat and the thermostat respectively, for varying the respective resistances in response to changes in atmospheric temperature and in density of the liquid respectively, and electrical conductors connecting the resistances, battery and instrument in circuit, with the resistances connected to the battery in parallel, the circuit connections being such that the contacts, upon an increase in atmospheric temperature and an increase in density, vary the respective resistances to affect the instrument oppositely, whereby the susceptibility of the cooling liquid to freezing, if subjected to the prevailing atmospheric temperature, is indicated by the instrument.

6. A freezing hazard indicator for an internal combustion engine with a cooling system having a liquid medium therein, said indicator comprising a hydrostat immersed in the liquid and subject to the specific gravity thereof, a first variable resistance, operating means for varying the first resistance operated by the hydrostat, a thermostat exposed to outside temperature and subject to the prevailing temperature thereof, a second variable resistance, operating means therefor actuated by the thermostat, a battery, an electrical indicating instrument, and conductors connecting the battery, instrument and resistances in a circuit with the resistances connected in parallel with each other and in series with the instrument and battery, the circuit arrangement being such that the first resistance, in response to an increase in specific gravity of the liquid, and the second resistance, in response to increase in the atmospheric temperature, oppositely vary the current to the instrument.

7. A freezing hazard indicator for an internal combustion engine with a cooling system having a liquid medium therein, said indicator comprising a hydrostat immersed in the liquid and subject to the specific gravity thereof, a first variable resistance, operating means for varying the first resistance operated by the hydrostat, a thermostat exposed to outside temperature and subject to the prevailing temperature thereof, a second variable resistance, operating means therefor actuated by the thermostat, a battery, an electrical indicating instrument, and conductors connecting the battery, instrument and resistances in a circuit in series, said operating means being arranged to vary their respective resistances oppositely upon a rise in atmospheric temperature and a rise in specific gravity of the liquid.

8. A freezing hazard indicator for an internal combustion engine with a cooling system having a liquid medium therein, said indicator comprising a hydrostat immersed in the liquid and subject to the specific gravity thereof, a first variable resistance, operating means for varying the first resistance operated by the hydrostat, a thermostat exposed to outside temperature and subject to the prevailing temperature thereof, a second variable resistance, operating means therefor actuated by the thermostat, a battery, an electrical indicating instrument, and conductors connecting the battery, instrument and resistances in a circuit with the resistances constituting the sides of a Wheatstone bridge circuit with the instrument in the bridge thereof, the circuit arrangement being such that the first resistance, in response to an increase in specific gravity of the liquid, and the second resistance, in response to increase in the atmospheric temperature, oppositely vary the current to the instrument.

GEORGE H. LECARPENTIER.